US008856001B2

(12) United States Patent
Emori et al.

(10) Patent No.: US 8,856,001 B2
(45) Date of Patent: Oct. 7, 2014

(54) SPEECH SOUND DETECTION APPARATUS

(75) Inventors: Tadashi Emori, Tokyo (JP); Masanori Tsujikawa, Tokyo (JP)

(73) Assignee: NEC Corporation, Tokyo` (JP)

( * ) Notice: Subject to any disclaimer, the term of this patent is extended or adjusted under 35 U.S.C. 154(b) by 670 days.

(21) Appl. No.: 13/125,493

(22) PCT Filed: Sep. 3, 2009

(86) PCT No.: PCT/JP2009/004339

§ 371 (c)(1),
(2), (4) Date: Apr. 21, 2011

(87) PCT Pub. No.: WO2010/061505

PCT Pub. Date: Jun. 3, 2010

(65) Prior Publication Data

US 2011/0202339 A1 Aug. 18, 2011

(30) Foreign Application Priority Data

Nov. 27, 2008 (JP) ................................ 2008-302242

(51) Int. Cl.
*G10L 15/00* (2013.01)

(52) U.S. Cl.
USPC ............................ 704/231; 704/210; 704/215

(58) Field of Classification Search
USPC ......... 704/233, 226, 208, 210, 211–215, 231, 704/278
See application file for complete search history.

(56) References Cited

U.S. PATENT DOCUMENTS 7,567,900 B2 * 7/2009 Suzuki et al. ................. 704/233
8,311,819 B2 * 11/2012 Hetherington et al. ....... 704/233

FOREIGN PATENT DOCUMENTS

JP 7-5895 A 1/1995
JP 2007068125 A 3/2007
JP 2007328228 A 12/2007
JP 2008158035 A 7/2008

OTHER PUBLICATIONS

International Search Report for PCT/JP2009/004339 mailed Nov. 2, 2009.

* cited by examiner

*Primary Examiner* — Huyen X. Vo
(74) *Attorney, Agent, or Firm* — Sughrue Mion, PLLC

(57) ABSTRACT

A speech sound detection apparatus receives an input audio signal (as a sound reception unit), and computes input power that indicates a magnitude of the sound represented by the audio signal (as an input power computation unit). The apparatus estimates a correction function that is a continuous function defining a relation between a certain frequency and a correction coefficient used to approximate the input power computed at that frequency to the reference power predetermined for that frequency (as a correction function estimation unit). The apparatus corrects the input power at every frequency, based upon the correction coefficient that is obtained in accordance with the relation defined by the estimated correction function (as an input power correcting unit). The apparatus further determines whether or not the sound represented by the received audio signal is speech sound, based upon the corrected input power (as a speech sound detection unit).

20 Claims, 4 Drawing Sheets

SPEECH SOUND DETECTION APPARATUS

The present application is the National Phase of PCT/JP2009/004339, filed Sep. 3, 2009, which claims the benefit of the priority based on the Patent Application No. 2008-302242 filed on Nov. 27, 2008 in Japan, which is in its entirety incorporated herein by reference.

FIELD OF THE INVENTION

The present invention relates to a speech sound detection apparatus capable of determining whether or not input sound is speech sound.

BACKGROUND ART

Speech sound detection apparatuses are well-known in the art that are used to determine whether or not input sound is speech sound (vocal sound uttered by a user). One example of this type of speech sound detection apparatuses disclosed in Patent Document 1 listed below has a plurality of microphones.

Such a speech sound detection apparatus receives an audio signal input through every one of the microphones. The speech sound detection apparatus computes input power that indicates a magnitude of sound represented by the audio signal (i.e., input power of the audio signal). The speech sound detection apparatus determines, based on the computed input power, whether or not the sound represented by the audio signal input through the microphone is speech sound.

As is prone to be with this type of the speech sound detection apparatuses, when input through more than one microphones, the same sound is represented in different levels of input power that indicate magnitudes of the sound represented as audio signals collected through the microphones (i.e., input power of the audio signals) because of dissimilarities inherent to the microphones, different degrees of deterioration over time, divergent types of signal transmission system (e.g., wiring), and the like.

In such a case, it is impossible to determine, based on some fixed criteria, whether or not the sound represented by the audio signals input through the microphones is speech sound. This means that accurate determination is impossible for each of the sounds acquired by such more than one microphones. To address this, it is deemed suitable to apply a signal correction device for correcting the input power of the audio signals received through the microphones.

An example of this type of signal correction devices is the one disclosed in Patent Document 2 listed below which receives audio signals input through one of microphones and computes a magnitude of input power of the received audio signals at every frequency range. Then, the signal correction device further computes a rate of the reference power used as a criterion (e.g., an average of all the magnitudes of the input power of the audio signals input through every one of the microphones) to the computed input power at every frequency range so as to determine a correction coefficient depending upon the computed rate.

Eventually, the signal correction device corrects the input power of the received audio signals based upon the correction coefficient thus determined. In this way, the input power of the received audio signals can be approximated to the reference power at every frequency range. Thus, applying the signal correction device to the speech sound detection apparatus enables accurate determination on whether or not the input sound through the microphones is speech sound.

Patent Document 1
Official Gazette of Preliminary Publication of Unexamined Japanese Patent Application No. 2008-158035
Patent Document 2
Official Gazette of Preliminary Publication of Unexamined Japanese Patent Application No. 2007-68125

SUMMARY OF THE INVENTION

In the above-mentioned signal correction device, sometimes an audio signal of input power at excessively higher (or excessively lower) frequency than the other is input for some reason (e.g., the input audio signals are superimposed with noise, or a delay time associated with propagation of the input audio signals is redundant). In such a case, the correction coefficient determined for such excessive frequency should be excessively smaller (or excessively larger). This unable the input power of the received audio signal at such frequency to be fully approximated to the reference power.

Because of this, there arises a problem that the aforementioned speech sound detection apparatus is, even when incorporated with the signal correction device as stated above, not able to precisely judge whether or not that input sound is speech sound.

Accordingly, it is an object of the present invention to provide a speech sound detection apparatus that can be a solution to the problem in the prior art that it is impossible 'to precisely determine whether or not the input sound is speech sound.'

To fulfill the object of the present invention, a speech sound detection apparatus in one aspect of the present invention comprises:

a sound reception unit for receiving an input audio signal, an input power computation unit performing an input power computation operation for computing at every frequency input power that indicates a magnitude of sound represented by an audio signal, based upon the audio signal received by the sound reception unit, a correction function estimation unit performing a correction function estimation operation for estimating a correction function that is a continuous function defining a relation between a certain frequency and a correction coefficient used to approximate the computed input power at that frequency to the reference power predetermined for that frequency, an input power correcting unit performing input power correction operation of multiplying the computed input power by the correction coefficient obtained in accordance with the relation defined by the estimated correction function, for correcting the input power at every frequency, and a speech sound detection unit performing a speech sound detection operation for determining whether or not the sound represented by the received audio signal is speech sound, based upon the corrected input power.

A speech sound detection method in another aspect of the present invention comprises:

based upon an audio signal received by a sound reception unit for receiving an input audio signal, computing input power that indicates a magnitude of sound represented by the audio signal, at every frequency, estimating a correction function that is a continuous function defining a relation between a certain frequency and a correction coefficient used to approximate the computed input power at that frequency to the reference power predetermined for that frequency, multiplying the computed input power by the correction coefficient obtained in accordance with the relation defined by the estimated correction function, for correcting the input power at every frequency, and determining whether or not the sound represented by the received audio signal is speech sound, based upon the corrected input power.

In still another aspect of the present invention, a speech sound detection program comprises instructions for causing an information processing device to realize:

an input power computation unit performing an input power computation operation for computing at every frequency input power that indicates a magnitude of sound represented by an audio signal received by a sound reception unit for receiving an input audio signal, based upon the audio signal received by the sound reception unit, a correction function estimation unit performing a correction function estimation operation for estimating a correction function that is a continuous function defining a relation between a certain frequency and a correction coefficient used to approximate the computed input power at that frequency to the reference power predetermined for that frequency, an input power correcting unit performing input power correction operation of multiplying the computed input power by the correction coefficient obtained in accordance with the relation defined by the estimated correction function, for correcting the input power at every frequency, and a speech sound detection unit performing a speech sound detection operation for determining whether or not the sound represented by the received audio signal is speech sound, based upon the corrected input power.

Configured in the aforementioned manner, the speech sound detection apparatus of the present invention is capable of precisely determining whether or not input sound is speech sound.

EXEMPLARY EMBODIMENT

Exemplary embodiments of a speech sound detection apparatus, a speech sound detection method, and a speech sound detection program in accordance with the present invention will now be described with reference to the accompanying drawings of FIGS. 1 to 4.

Embodiment 1

Figure 1:
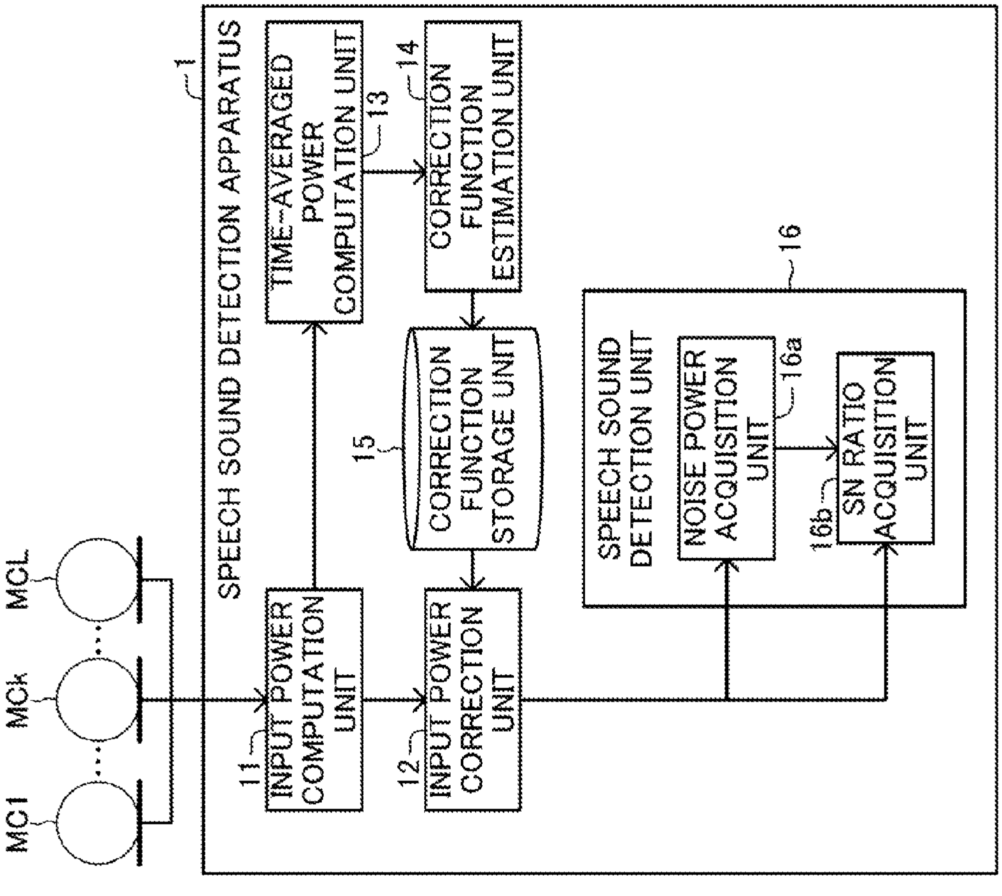
FIG. 1 is a schematic block diagram illustrating various function units of a first exemplary embodiment of a speech sound detection apparatus according to the present invention.

As shown in FIG. 1, a speech sound detection apparatus 1 in a first exemplary embodiment of the present invention is an information processing device. The speech sound detection apparatus 1 is comprised of a central processing unit CPU (not shown), data storage devices (a memory and a hard disk drive HDD), and an input device.

The input device is connected to a plurality of microphones, MC1, MC2, . . . MCk, . . . MCL (herein k is an integer varied from 1 to L). The microphones collect ambient sound and produce an audio signal representing the collected sound to the input device. The input device receives the audio signals produced by each of the microphones. The input device and the microphones MC1 to MCL constitute a speech sound reception unit.

The speech sound detection apparatus 1 configured as in the above has functions implemented by the CPU's executing a program as detailed below and depicted in the flow chart of FIG. 2. Alternatively, these functions may be implemented by hardware such as logic circuits.

The speech sound detection apparatus 1 behaves similarly to all the plurality of the microphones MC1 to MCL. Thus, features of the speech sound detection apparatus 1 in association with arbitrary one MCk of all the microphones MC1 to MCL will be discussed below.

The speech sound detection apparatus 1 is comprised of function units of an input power computation unit (input power computation means) 11, an input power correcting unit (input power correction means) 12, a time-averaged power computation unit (time-averaged power computation means) 12, a correction function estimation unit (correction function estimation means) 14, a correction function storage unit 15 (correction function storage means) 15, and a speech sound detection unit (speech sound detection means) 16.

The input power computation unit 11 performs A/D (analog-digital) conversion of audio signals input through the microphone MCk to convert the audio signals from analog signals into digital signals.

Furthermore, the input power computation unit 11 divides each of the audio signals for every predetermined frame interval (at uniform interval in this embodiment). The input power computation unit 11 performs an operation as detailed below for each signal portion (i.e., each frame signal) of the divided audio signal as follows.

The input power computation unit 11 performs predetermined preprocesses for each frame signal (e.g., pre-emphasis processing, multiplication by a window function, and the like). After that, the input power computation unit 11 performs fast Fourier transformation operation for each frame signal to acquire a frame signal (a complex number containing real and imaginary number components in some frequency range.

The input power computation unit 11 computes as an input power $x_i(t)$ the sum of values resulting from squaring the real and imaginary number components of the frame signal acquired in the previous processing step and performs the same operation at every frequency range.

For instance, in the case of using a digital signal that is a signal sampled at frequency rate of 44.1 kHz and 16-bit quantified, FFT processing on 1024 sampling points at every frame interval of 10 ms results in the input power $x_i(t)$ being produced every 43 Hz where i is a number corresponding to the frequency (in this embodiment, incrementing i by one is corresponding to increasing the frequency by approximately 43 Hz), and t is a number representing a position of each frame signal on the time basis (e.g., a frame number specifying each frame).

In this way, the input power computation unit 11 divides the audio signal received through the microphone MCk for every predetermined frame interval, and then computes the input power $x_i(t)$ for each signal portion (i.e., each frame signal) of the divided audio signal at every frequency.

The input power correcting unit 12 performs an arithmetic operation of multiplying the input power $x_i(t)$ produced from the input power computation unit 11 by a correction coefficient $f_i$ stored in the correction function storage unit 15 and performing the same operation at every frequency so as to correct the input power $x_i(t)$. Then, the input power correcting unit 12 produces corrected input power $x'_i(t)$.

In this embodiment, the correction coefficient $f_i$ is a value acquired in accordance with a relation defined by the correction function. The correction function is a continuous function defining a relation of the number i corresponding to a certain frequency (i.e., i designates the frequency) with the correction coefficient $f_i$ used to approximate the input power $x_i(t)$ computed at that frequency to the reference power determined for that frequency. In this embodiment, the correction function is a polynomial function dealing with a variable of the frequency. As mentioned later, the correction function is estimated by the time-averaged power computation unit 13 and the correction function estimation unit 14.

The time-averaged power computation unit 13 computes a time-averaged power $x_i$ (i.e., a mean value of a plurality of values of $x_i(t)$ with regard to the varied values of t) at every frequency by means of averaging merely restricted values of the input power $x_i(t)$ computed on the frame signal in relation with a predetermined averaging time T among all the values of the input power $x_i(t)$ computed by the input power computation unit 11 (i.e., the values of the input power computed on all the signal frames of uniform intervals resulting from segmentation of the audio signal).

The time-averaged power $x_i$ exists as many as half the sampling points for the FFT processing, namely, N in number. For instance, in the case of performing the FFT processing on 1024 sampling points, the number N is 512 or N=512. This means that there are 512 of the values of the time-averaged power $x_i(t)$, such as $x_1, x_2, \ldots, x_{511}$.

The correction function estimation unit 14 estimates a correction function defining a relation of a certain frequency with the correction coefficient $f_i$ used to approximate the time-averaged power $x_i$ computed by the time-averaged power computation unit 13 to the reference power determined for that frequency. In this embodiment, the correction function estimation unit 14 uses, as the reference power $y_i$, the time-averaged power $x_i$ computed by the time-averaged power computation unit 13 for a single microphone MCr (herein, r is an integer varied from 1 to L) assigned to the reference microphone among all the microphones MC1 to MCL.

Specifically, the correction function estimation unit 14 computes a matrix A based on the formula (1) as follows.

[formula 1]

$$A = \begin{pmatrix} \sum_{i=1}^{N} x_i^2 i^{2M} & \sum_{i=1}^{N} x_i^2 i^{2M-1} & \cdots & \sum_{i=1}^{N} x_i^2 i^{M} \\ \sum_{i=1}^{N} x_i^2 i^{2M-1} & \ddots & \ddots & \vdots \\ \vdots & \ddots & \ddots & \vdots \\ \sum_{i=1}^{N} x_i^2 i^{M} & \cdots & \cdots & \sum_{i=1}^{N} x_i^2 i^{0} \end{pmatrix} \quad (1)$$

The correction function estimation unit 14 uses, as the variable $x_i$ in each of the terms in the matrix A in the formula (1), the time-averaged power $x_i$ computed by the time-averaged power computation unit 13 for the microphone MCk. M is an order of the correction unction. M is a predetermined value. Preferably, M is a value varied from 0 to 20.

Moreover, the correction function estimation unit 14 computes a vector b based on the formula (2) as follows.

[formula 2]

$$b = \begin{pmatrix} \sum_{i=1}^{N} x_i y_i i^{M} \\ \sum_{i=1}^{N} x_i y_i i^{M-1} \\ \vdots \\ \sum_{i=1}^{N} x_i y_i i^{0} \end{pmatrix} \quad (2)$$

The correction function estimation unit 14 uses, as the variable $y_i$ in each of the component coordinates representing the vector b, the time-averaged power (reference power) $x_i$ computed by the time-averaged power computation unit 13 for the reference microphone MCr.

Then, the correction function estimation unit 14 computes a vector a based on the matrix A and the vector b respectively computed in the previous steps and the formula (3) as follows, where the vector a is represented as vector $a=(a_M, \ldots, a_1, a_0)^T$.

[formula 3]

$$Aa=b \quad (3)$$

Furthermore, the correction function estimation unit 14 computes the correction coefficient $f_i$ based on the computed vector a and the following formula (4) at every frequency. The formula (4) represents a correction function that is a polynomial function with regard to a variable of the number i corresponding to each frequency (i.e., i designates the frequency). In other words, computing the vector a correlates with estimating the correction function.

[formula 4]

$$f_i = \sum_{j=0}^{M} a_j i^j \quad (4)$$

The correction function storage unit 15 correlates the correction coefficient $f_i$ computed by the correction function estimation unit 14 with the number i corresponding to the frequency so as to store them in the data storage device.

As mentioned above, the input power correcting unit 12 corrects the input power $x_i(t)$ computed by the input power computation unit 11, based upon the following formula (5). Specifically, the input power correcting unit 12 multiplies the input power $x_i(t)$ produced from the input power computation unit 11 by the correction coefficient $f_i$ stored in the correction function storage unit 15 and performs the same operation at every frequency, so as to correct the power $x_i(t)$ itself. Thus, the input power correcting unit 12 produces the corrected input power $x'_i(t)$.

[formula 5]

$$x'_i(t)=f_i x_i(t) \quad (5)$$

The formulae (1) to (3) are derived from obtaining the vector a according to which the sum of all the values, at a predetermined frequency range (in this embodiment, a range covering all the varied values of the number i corresponding to the frequency), resulting from squaring the difference between the corrected input power $x'_i$ and the time-averaged power $y_i$ (reference power) computed by the time-averaged power computation unit 13 for the reference microphone MCr is minimal.

In this way, it is possible to enlarge the frequency range that enables the received audio signal to be fully approximated to the reference power.

More specifically, the formulae (1) to (3) are derived from finding formulae of partially differentiating the function of squaring the difference between the reference power $y_i$ and the corrected input power $x'_i(=f_i x_i)$ with respect to each coefficient $a_j$ of the correction function (herein, j is an integer varied from 0 to M), equalizing the formulae to zero to obtain M+1 equations, and uniting them in a set of simultaneous equations.

The speech sound detection unit 16 performs speech sound detection for determining whether or not sound represented by the audio signal received through the microphone MCk is speech sound, based upon the input power $x'_i(t)$ produced (corrected) by the input power correcting unit 12.

More specifically, the speech sound detection unit 16 is comprised of a noise power acquisition unit (noise power acquisition means) 16*a* and a signal-to-noise ratio acquisition unit (signal-to-noise ratio acquisition means) 16*b*.

The noise power detection unit 16*a* acquires noise power $N_i(t)$ that indicates a magnitude of noise in the sound represented by the audio signal received through the microphone MCk, and performs the same operation at every frequency.

Specifically, when the input power $x'_i(t)$ produced at every frequency by the input power correcting unit 12 for the microphone MCk is the maximum among all the values of the input power $x'_i(t)$ produced at the corresponding frequency by the same for the microphones MC1 to MCL, the noise power acquisition unit 16*a* acquires, as the noise power $N_i(t)$, the minimal value among all the values of the input power $x'_i(t)$ produced by the input power correcting unit 12 for all the microphones MC1 to MCL.

On the other hand, when the value of the input power $x'_i(t)$ produced at every frequency by the input power correcting unit 12 for the microphone MCk is not the maximum among all the values of the input power $x'_i(t)$ produced by the same at the corresponding frequency for the microphones MC1 to MCL, the noise power acquisition unit 16*a* acquires, as the noise power $N_i(t)$, the value of the input power $x'_i(t)$ produced by the input power correcting unit 12 for the microphone MCk.

This may be paraphrased as follows: The noise power acquisition unit 16*a* acquires, as the noise power $N_i(t)$ correlated to the microphone receiving the audio signal from which the maximum value among those of the input power $x'_i(t)$ produced at every frequency by the input power correcting unit 12 for the microphones MC1 to MCL is derived, the minimum value among those of the input power $x'_i(t)$ produced by the input power correcting unit 12 for all the microphones MC1 to MCL.

Also in paraphrase, the noise power acquisition unit 16*a* acquires, as the noise power $N_i(t)$ correlated to each of the microphones other than the microphone of the maximized power, the input power $x'_i(t)$ produced at every frequency by the input power correcting unit 12 in for that microphone.

In this way, the speech sound detection apparatus 1 is configured to have a greater signal-to-noise ratio SNR(t) for the microphone of the maximized power in contrast with that for any of the remaining microphones.

As a consequence, it can be determined from the sound input through the microphone of the maximized power whether or not the sound is speech sound. Thus, the determination if the input sound is speech sound is made with the enhanced precision.

The signal-to-noise ratio acquisition unit 16*b* divides the input power $x'_i(t)$ produced from the input power correcting unit 12 by the noise power $N_i(t)$ acquired by the noise power acquisition unit 16*a*, and performs the same operation at every frequency, so as to compute a signal-to-noise per frequency ratio $SNR_i(t)$. In addition, the signal-to-noise ratio acquisition unit 16*b* acquires, as representative one of all the values of the signal-to-noise per frequency ratio $SNR_i(t)$ the sum of all the values of the signal-to-noise per frequency ratio $SNR_i(t)$ at a predetermine frequency range (in this embodiment, at a range covering all the frequency varied corresponding to the varied values of the number i).

Alternatively, the signal-to-noise ratio acquisition unit 16*b* may be configured to acquire the signal-to-noise ratio SNR(t) that is the maximum of all the values of the signal-to-noise per frequency ratio $SNR_i(t)$.

If the signal-to-noise ratio SNR(t) acquired by the signal-to-noise acquisition unit 16*b* is greater than a predetermined threshold, the speech sound detection unit 16 determines that the sound represented by the audio signal received through the microphone MCk is speech sound. Reversely, if the signal-to-noise ratio SNR(t) acquired by the signal-to-noise acquisition unit 16*b* is smaller than the threshold, the speech sound detection unit 16 determines that the sound represented by the audio signal received through the microphone MCk is not speech sound.

Then, operation of the aforementioned speech sound detection apparatus 1 will be detailed below.

Figure 2:
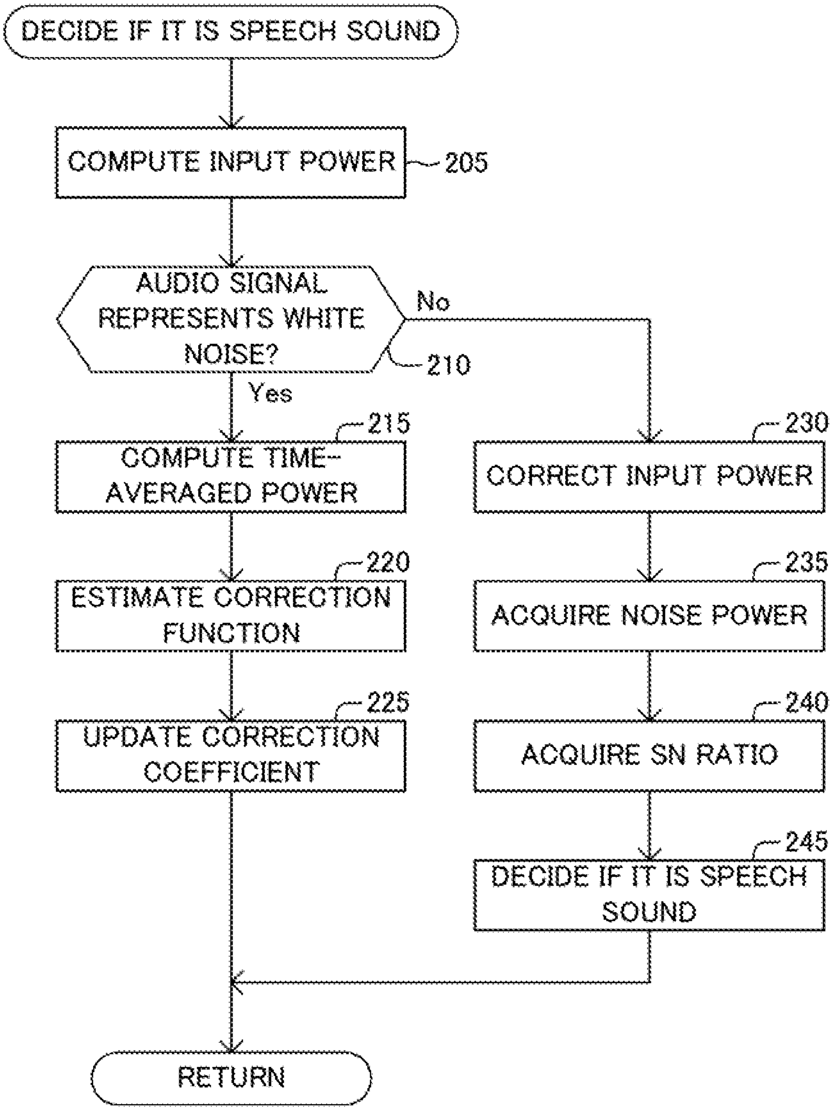
FIG. 2 is a flow chart illustrating a speech sound detection program executed by the CPU of the speech sound detection apparatus shown in FIG. 1.

The CPU of the speech sound detection apparatus 1 executes a speech sound detection program illustrated in the flow chart of FIG. 2 each time a predetermined arithmetic operation cycle passes over.

Specifically, once initiating the speech sound detection program, the CPU receives audio signals input through the microphones MC1 to MCL at Step 205. Then, the CPU divides each of the received audio signals for every predetermined frame interval, and thereafter, it performs an arithmetic operation of computing the input power $x_i(t)$ of each portion (frame signal) of the divided audio signal and performing the same operation for each of the microphones MC1 to MCL (input power computation step).

At step 210, the CPU determines whether or not the received audio signal is an audio signal representing white noise.

The following discussion is continued, assuming that the received audio signal is the audio signal representing white noise. In such a case, the speech sound detection apparatus 1 performs a correction function estimation process (a process of updating the correction coefficient $f_i$ stored in the data storage device) to estimate the correction function for each of the microphones MC1 to MCL.

Specifically, the CPU passes an affirmative judgment 'YES' to proceed to Step 215. Then, the CPU performs a time-averaged power computation process for each of the microphones MC1 to MCL for producing time-averaged power $x_i$ that is an average of restricted values of the input power $x_i(t)$ computed for each frame signal over an averaging time T among all the values of the input power $x_i(t)$ computed at Step 205 (i.e., the input power computed for each of the portions derived from dividing the audio signal for every determined frame interval), and performing this processing at every frequency (time-averaged power computation step).

Then, at Step 220, the CPU carries out an operation of estimating the correction function based on the time-averaged power $x_i$ computed for a certain microphone MCk and the time-averaged power $y_i$ computed for the reference microphone MCr, performing the same correction function estimation operation for each of the microphones MC1 to MCL. More specifically, the CPU carries out the operation of computing the vector a based upon the aforementioned formulae (1) to (3), performing the same operation for each of the microphones MC1 to MCL (correction function estimation step).

Next, at Step 225, the CPU performs an operation of computing the correction coefficient $f_i$ based on the vector a computed in the previous step, performing the same operation for each of the microphones MC1 to MCL. If the correction coefficient $f_i$ has already been stored in the memory device, the CPU updates the correction coefficient $f_i$ by replacing the one already stored with the one most recently computed. Reversely, if the correction coefficient $f_i$ has not been stored in the memory device (the correction coefficient $f_i$ is computed for the first time), the CPU stores the correction coefficient $f_i$ currently obtained through the computation operation.

The following discussion is on the assumption that the received audio signal is not the one representing white noise. In this case, the speech sound detection apparatus 1 performs an operation of correcting the input power of the audio signal received through the microphone MCk, performing the same input power correcting operation for each of the microphones MC1 to MCL.

Specifically, at Step 210, the CPU passes a negative judgment 'NO' and proceeds to Step 230, and then, carries out an operation of multiplying the input power $x_i(t)$ computed at the previous step 205 by the coefficient $f_i$ stored in the memory device, performing the same input power correcting operation at every frequency (i.e., covering every one of the varied values of the number i corresponding to the frequency) and for each of the microphones MC1 to MCL (input power correcting step). Then, the CPU produces the corrected input power $x'_i(t)$.

Further next, at Step 235, the CPU performs an operation of acquiring noise power $N_i(t)$ based upon the input power $x'_i(t)$ produced in the previous step, performing the same noise power acquisition operation for each of the microphones MC1 to MCL (noise power acquisition step).

Specifically, as the noise power $N_i(t)$ for the microphone (the maximum power microphone) that has received the audio signal from which the maximum of the input power $x'_i(t)$ is derived above all the other values of the input power $x'_i(t)$ produced for each of the microphones MC1 to MCL, the CPU acquires the minimum of all the values of the input power $x'_i(t)$ produced for each of the microphones MC1 to MCL, performing the same operation at every frequency.

Moreover, as the noise power $N_i(t)$ for each of all the microphones but the maximum power microphone, the CPU acquires the input power $x'_i(t)$ produced for the microphone, performing the same operation at every frequency.

Figure 3:
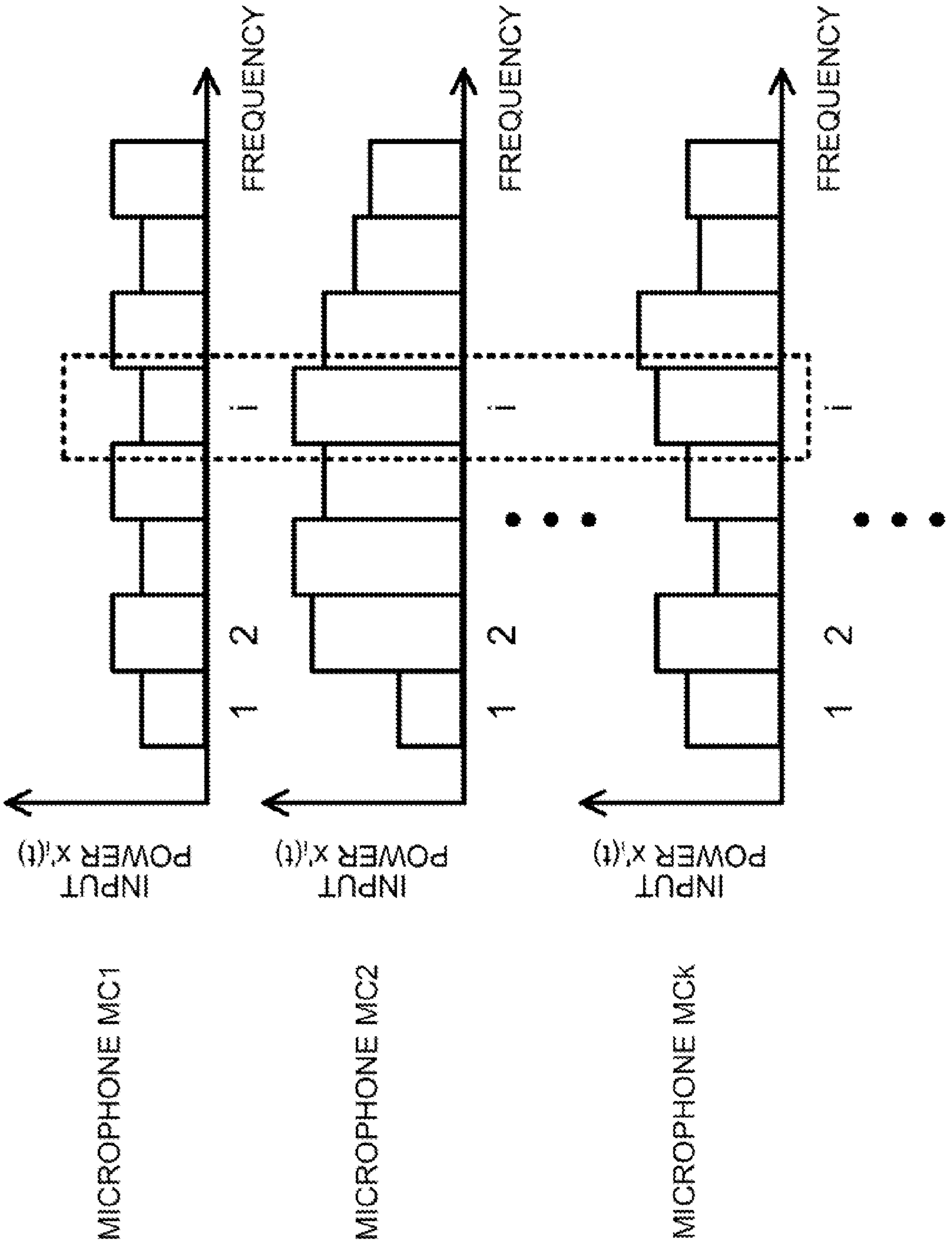
FIG. 3 illustrates graphs of exemplary input power computed for every one of a plurality of microphones.

One example of the operation of the CPU's acquiring the noise power $N_i(t)$ will be described in terms of the frequency correlated with the number i. Herein, as shown in FIG. 3, discussed is a case in which the input power $x'_i(t)$ for the microphone MC1 is the minimum among all the values of the input power $x'_i(t)$ produced for each of the microphones MC1 to MCL while the input power $x'_i(t)$ for the microphone MC2 is the maximum.

In this case, the CPU acquires the input power $x'_i(t)$ produced for the microphone MC1, as the noise power $N_i(t)$ for the microphone MC1. Also, the CPU acquires the input power $x'_i(t)$ produced for the microphone MC1, as the noise power $N_i(t)$ for the microphone MC2. The CPU acquires the input power $x'_i(t)$ produced for the microphone MCk, as the noise power $N_i(t)$ for the microphone MCk.

In this way, the CPU acquires the noise power $N_i(t)$ for every one of the microphones MC1 to MCL at every frequency.

Then, at Step 240, the CPU performs an operation of dividing the input power $x'_i(t)$ produced in the previous step by the noise power $N_i(t)$ acquired in the previous step so as to compute the signal-to-noise per frequency ratio $SNR_i(t)$, performing the same computation operation at every frequency for each of the microphones MC1 to MCL.

Furthermore, the CPU acquires, as the signal-to-noise ratio SNR(t), the sum of all the values of the signal-to-noise per frequency ratio $SNR_i(t)$ computed in the previous step at a predetermined frequency range (in this embodiment, a range covering all the varied values of the number i corresponding to the frequency), performing the same SNR acquisition operation for each of the microphones MC1 to MCL (signal-to-noise ratio acquiring step).

Then, at Step 245, the CPU performs an operation of determining if the signal-to-noise ratio SNR(t) acquired in the previous step is greater than a predetermined threshold so as to determine whether or not the sound represented by the audio signal received through the microphone MCK is speech sound, performing the same determination operation for each of the microphones MC1 to MCL (speech sound detection step). As has been described, the decision made by the CPU that the signal-to-noise ratio SNR(t) is greater than the threshold corresponds to the decision by the CPU that the sound represented by the audio signal received through the microphone MCk is speech sound.

As has been described, in the first embodiment of the present invention, the speech sound detection apparatus 1 estimates a correction function defining a relation between a certain frequency and a correction coefficient $f_i$, and thereafter, it multiplies the input power representing a magnitude of the sound represented by the audio signal (the input power of the audio signal) by the correction coefficient $f_i$ set based on the estimated correction function so as to correct the input power.

In this way, even if an audio signal, which has input power excessively greater at a certain frequency than at the remaining frequency levels frequency levels for some reason or other, is input, the audio signal thus received can be fully approximated to the reference power.

Thus, configured in the aforementioned manner, the speech sound detection apparatus is able to approximate the input power of the received audio signal to the reference power with the enhanced precision by means of correcting the input power of the audio signal. As a consequence, it is possible to precisely determine whether or not the input sound is speech sound (i.e., sound uttered by a user).

Further, in the first exemplary embodiment, the correction function is a polynomial function with respect to a variable of the frequency.

In this way, adjusting the order M of the polynomial function permits a degree of gradual variation in the correction coefficient $f_i$ relative to variation in the frequency to be adjusted.

In addition, in the first exemplary embodiment, the speech sound detection apparatus 1 is adapted to take, as the reference power $y_i(t)$ the input power $x_i(t)$ computed for the reference microphone MCr that is one of all the microphones MC1 to MCL.

In this manner, the input power $x_i(t)$ of the audio signal received through each of the microphones MC1 to MCL can be fully approximated to the input power (reference power) $y_i(t)$ of the audio signal received through the reference microphone MCr.

Also, in the first exemplary embodiment, the speech sound detection apparatus 1 is configured to estimate the correction function based upon the time-averaged power $x_i$ obtained by averaging all the values of the input power $x_i(t)$ computed for each of the plurality of frame signals.

In this manner, the sound converted into the audio signal on which the time-averaged power is computed for each of the microphones MCk and the sound converted into the audio signal on which the time-averaged power is computed for the reference microphone MCr conform to a greater degree. As a consequence, correcting the input power of the audio signal received through each of the microphones MCk permits it to be fully approximated to the reference power (i.e., the time-averaged power computed for the reference microphone MCr).

Also, configured in the aforementioned manner, for example, the speech sound detection apparatus is capable of alleviating adverse effects of noise even if sound developed from a sound source is superimposed with the noise for a relatively short cycle. Thus, the input power $x_i(t)$ of the audio signal received through each of the microphones MCk can be approximated to the reference power $y_i(t)$ with the enhanced precision.

Embodiment 2

Figure 4:
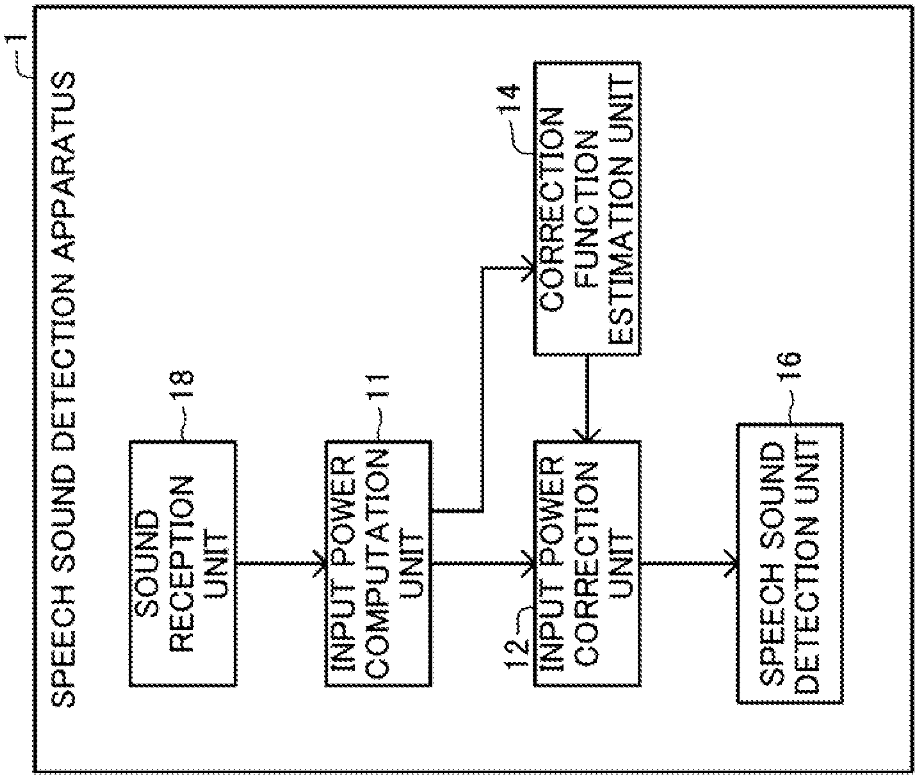
FIG. 4 is a schematic block diagram illustrating various function units of a second exemplary embodiment of the speech sound detection apparatus according to the present invention.

Then, a second exemplary embodiment of the speech sound detection apparatus according to the present invention will be detailed with reference to FIG. 4.

The speech sound detection apparatus 1 in the second exemplary embodiment has function units of a sound reception unit (sound reception means) 18, an input power computation unit (input power computation means) 11, an input power correcting unit (input power correction means) 12, a correction function estimation unit (correction function estimation means) 14, and a speech sound detection unit (speech sound detection means) 16.

The sound reception unit 18 receives audio signals externally input.

The input power computation unit 11 performs, based on each audio signal received by the sound reception unit 18, an operation of computing input power that indicates a magnitude of the sound represented by the audio signal, performing the same operation at every frequency.

The correction function estimation unit 14 carries out an operation of estimating a correction function that is a continuous function defining a relation between a certain frequency and a correction coefficient used to approximate the input power computed by the input power computation unit 11 at that frequency to the reference power determined at that frequency.

The input power correcting unit 12 performs an operation of multiplying the input power produced from the input power computation unit 11 by the correction coefficient acquired in accordance with the relation defined by the correction function estimated by the correction function estimation unit 14 so as to correct the input power at every frequency.

The speech sound detection unit 16 carries out an operation of determining, based on the input power corrected by the input power correcting unit 12, whether or not the audio signal received by the sound reception unit 18 is speech sound.

In this manner, the speech sound detection apparatus 1 estimates a correction function defining the relation between a certain frequency and a correction coefficient and multiplies the input power indicating a magnitude of the sound represented by the received audio signal (i.e., the input power of the audio signal) by the correction coefficient set based upon the estimated correction function so as to correct the input power.

In this way, even if an audio signal, which has input power excessively greater (or smaller) at a certain frequency than at the remaining frequency levels frequency levels for some reason or other, is input, the audio signal thus received can be fully approximated to the reference power.

Thus, configured as in the aforementioned manner, the speech sound detection apparatus is capable of correcting the input power of the input audio signal so as to precisely approximate the input power of the audio signal to the reference power. As a consequence, it can be determined whether or not the sound input is speech sound (sound uttered by the user) with the enhanced precision.

In this case, the correction function is preferably a polynomial function with respect to a variable of the frequency.

In this way, adjusting the order of the polynomial function permits a degree of gradual variation in the correction coefficient relative to variation in the frequency to be adjusted.

In this case, the correction function estimation unit is preferably adapted to estimate the correction function where the sum of all the values resulting from squaring the difference between the corrected input power and the reference power at a predetermined frequency range is minimal.

In this manner, it is possible to enlarge the frequency range that enables the input power of the received audio signal to be fully approximated to the reference power.

In this case, the speech sound detection unit is preferably configured to include a noise power acquisition unit for acquiring, at every frequency, noise power that indicates a magnitude of noise in the sound represented by the audio signal received by the sound reception unit, and a signal-to-noise ratio acquisition unit computing a signal-to-noise per frequency ratio by dividing the corrected input power by the acquired noise power and acquiring at every frequency a signal-to-noise ratio that is a representative value of all the values of the computed signal-to-noise per frequency ratio, thereby determining that the sound represented by the received audio signal is speech sound if the acquired signal-to-noise ratio is greater than a predetermined threshold.

In this case, the signal-to-noise ratio acquisition unit is preferably adapted to acquire, as the signal-to-noise ratio, the sum of all the values of the computed signal-to-noise per frequency ratio over a predetermined frequency range.

In an alternative embodiment of the speech sound detection apparatus, the signal-to-noise ratio acquisition unit is preferably adapted to acquire, as the signal-to-noise ratio, the maximum of all the values of the computed signal-to-noise per frequency ratio.

In this case, the speech sound detection apparatus is preferably comprised of a plurality of the sound reception units;

the input power computation unit is adapted to perform the input power computation operation for each of the plurality of the sound reception unit;

the correction function estimation unit is adapted to perform a correction function estimation operation for each of the plurality of the sound reception units;

the input power correcting unit is adapted to perform the same input power correction operation for each of the plurality of the sound reception units; and the speech sound detection unit is adapted to perform the speech sound detection operation for each of the sound reception units and to take at every frequency the minimum of all the values of the input power corrected for each of the plurality of the sound reception units by the input power correcting unit, as the noise power for the sound reception unit which has received the audio signal being the basis to calculate the maximum of all the values of the input power corrected for each of the plurality of the sound reception units by the input power correcting unit.

In this case, the speech sound detection apparatus is preferably adapted to take at every frequency, as the noise power for the sound reception unit, the input power corrected for the sound reception unit by the input power correcting unit, the sound reception unit being other than the sound reception unit which has received the audio signal being the basis to calculate the maximum of all the values of the input power corrected for each of the plurality of the sound reception units by the input power correcting unit.

When the plurality of the sound reception units (e.g., microphones) are located relatively close to one another, however, the sound uttered to a certain one of the plurality of the sound reception units (a first sound reception unit) is likely to be input to another of the sound reception units (a second sound reception unit).

In this case, since a signal-to-noise ratio of the sound input through the second sound reception unit should be smaller than that of the sound input through the first sound reception unit, it would be impossible to precisely determine based on the sound input through the second sound reception unit whether or not the sound is speech sound.

On the contrary, the speech sound detection apparatus configured as mentioned above is adapted to set at higher level the signal-to-noise ratio for the sound reception unit that has received the audio signal producing the maximum of all the values of the computed input power, in comparison with the signal-to-noise ratio for any of the remaining sound reception units.

As a consequence, it becomes possible to determine, based on the sound input through the sound reception unit that has received the audio signal producing the maximum of all the values of the computed input power, whether or not the sound is speech sound. Thus, it can be precisely determined whether or not the sound is speech sound.

In this case, the correction function estimation unit is preferably adapted to take, as the reference power, the input power computed for one of the plurality of the sound reception units by the input power computation unit.

In this manner, the input power of the audio signal received from each of the plurality of the sound reception units can be fully approximated to the input power (reference power) of the audio signal received through a certain one of the sound reception units (i.e., the reference sound reception unit).

In this case, the input power computation unit is adapted to divide the audio signal received by each of the sound reception units for every predetermined frame interval and compute the input power for each of the divided portions at every frequency;

the speech sound detection apparatus comprises a time-averaged power computation unit that performs a time-averaged power computation operation for each of the plurality of the sound reception units for computing time-averaged power that is an average of all the values of the input power computed for each of the portions of the audio signal by the input power computation unit; and the correction function estimation unit is preferably adapted to perform a correction function estimation operation for each of the plurality of the sound reception units for estimating a correction function defining a relation between a certain frequency and a correction coefficient used to approximate the time-averaged power computed at that frequency to the time-averaged power computed on a certain one of the plurality of the sound reception units by the time-averaged power computation unit and especially computed at that frequency.

When the plurality of the sound reception units (e.g., microphones) are located at relatively greatly varied distances away from a sound source uttering the sound that is to be converted to an audio signal, a delay time associated with propagation of the sound from the sound source to each of the sound reception units is relatively greatly varied from one unit to the other.

Thus, when, at a certain point of time, one of the plurality of the sound reception units (a first sound reception unit) receives a first audio signal while the another of the sound reception units (a second sound reception unit) receives a second audio signal, the sound that is to be converted into the first audio signal and the same sound that is to be converted into the second audio signal are perceived as being different from each other.

Also, when time required to transmit the audio signal from the first sound reception unit to the signal correction device and that from the second sound reception unit to the signal correction device are relatively greatly different, the sound received through the first sound reception unit and converted into the first audio signal and the same sound received through the second sound reception unit and converted into the second audio signal are also perceived as being different from each other.

In this case, configured to estimate the correction function for the audio signal only at a certain point of time of its duration, the speech sound detection apparatus cannot fully approximate the input power of the audio signal received by the first sound reception unit to the input power (reference power) of the audio signal received by the second sound reception unit.

In comparison, the speech sound detection apparatus in this embodiment is adapted to conform to a greater degree the sound that is received by the first and second sound reception units and is to be converted into the audio signal on which the time-averaged power is computed respectively. As a consequence, correcting the input power of the audio signal received by the first sound reception unit permits it to be fully approximated to the reference power (i.e., the time-averaged power computed for the second sound reception unit).

In the aforementioned manner, even if the sound uttered from the sound source is superimposed with noise for a relatively short duration, adverse effects of the noise can be alleviated. Thus, the input power of the audio signal received by the first sound reception unit can be approximated to the reference power with the enhanced precision.

In another embodiment of the speech sound detection apparatus, the correction function estimation unit is preferably adapted to take, as the reference power, an average of all the values of the input power computed by the input power computation unit for each of the plurality of the sound reception units.

In this manner, even if excessive noise is developed in the vicinity of a certain one of the sound reception units, adverse effects of such noise on the reference power can be alleviated.

In this case, the input power computation unit is preferably configured to divide the audio signal received by the sound reception unit for every predetermined frame interval for computing the input power of each of the signal portions at every frequency;

the speech sound detection apparatus is preferably comprised of a time-averaged computation unit that performs an operation of computing time-averaged power which is an average of all the values of the input power computed for each of the portions of the audio signal by the input power computation unit, and performing the time-averaged computation operation for each of the plurality of the sound reception units; and the correction function estimation unit is preferably adapted to perform an operation of estimating a correction function that defines a relation between a certain frequency and a correction coefficient used to approximate the time-averaged power computed at that frequency to the average time-averaged power that is an average of all the values of the time-averaged power computed by the time-averaged power computation unit for each of the plurality of the sound reception units and especially computed at that frequency.

In this manner, the sound converted into the audio signal on which time-averaged power is computed for a certain one of the plurality of the sound reception units (a first sound reception unit) and the sound converted into the audio signal on which average time-averaged power is computed by averaging all the values of the time-averaged power for each of the sound reception units can conform to a greater degree. As a consequence, correcting the input power of the audio signal received by the first sound reception unit permits it to be fully approximated to the reference power (i.e., the average time-averaged power obtained by averaging all the values of the time-averaged power computed for every one of the sound reception units).

In the speech sound detection apparatus configured as in the above, even if sound uttered from s sound source is superimposed with noise for a relatively short duration, adverse effects of such noise can be alleviated. Thus, the input power of the audio signal received by the first sound reception unit can be approximated to the reference power with the enhanced precision.

In this case, the correction function estimation unit is preferably adapted to take a value stored in advance as the reference power.

Also, in this case, the correction function estimation unit is adapted to estimate a correction function when the sound represented by the audio signal received by the sound reception units is white noise.

Moreover, a speech sound detection method in another embodiment according to the present invention comprises:

based upon an audio signal received by a sound reception unit for receiving an input audio signal, computing input power that indicates a magnitude of sound represented by the audio signal, at every frequency, estimating a correction function that is a continuous function defining a relation between a certain frequency and a correction coefficient used to approximate the computed input power at that frequency to the reference power predetermined for that frequency, multiplying the computed input power by the correction coefficient obtained in accordance with the relation defined by the estimated correction function, for correcting the input power at every frequency, and determining whether or not the sound represented by the received audio signal is speech sound, based upon the corrected input power.

In this case, the correction function is preferably a polynomial function with regard to a variable of the frequency range.

Also, in the speech sound detection method, estimating a correction function is preferably estimating a correction function according to which the sum of all the values resulting from squaring the difference between the corrected input power and the reference power over a predetermined frequency range is minimal.

In this case, the speech sound detection method is preferably adapted to comprise:

at every frequency, acquiring noise power that indicates a magnitude of noise in the sound represented by the audio signal received by the sound reception unit, at every frequency, dividing the corrected input power by the acquired noise power to compute a signal-to-noise per frequency ratio, for acquiring a signal-to-noise ratio that is a representative value of all the values of the computed signal-to-noise per frequency ratio, and if the acquired signal-to-noise ratio is greater than a predetermined threshold, it is determined that the sound represented by the received audio signal is speech sound.

A speech sound detection program in still another embodiment according to the present invention comprises instructions for causing an information processing device to realize:

an input power computation unit performing an input power computation operation for computing at every frequency input power that indicates a magnitude of sound represented by an audio signal received by a sound reception unit for receiving an input audio signal, based upon the audio signal received by the sound reception unit, a correction function estimation unit performing a correction function estimation operation for estimating a correction function that is a continuous function defining a relation between a certain frequency and a correction coefficient used to approximate the computed input power at that frequency to the reference power predetermined for that frequency, an input power correcting unit performing input power correction operation of multiplying the computed input power by the correction coefficient obtained in accordance with the relation defined by the estimated correction function, for correcting the input power at every frequency, and a speech sound detection unit performing a speech sound detection operation for determining whether or not the sound represented by the received audio signal is speech sound, based upon the corrected input power.

In this case, the correction function is preferably a polynomial function with regard to a variable of the frequency.

In this case, estimating a correction function is preferably estimating a correction function according to which the sum of all the values resulting from squaring the difference between the corrected input power and the reference power over a predetermined frequency range is minimal.

In this case, determining whether or not sound is speech sound includes:

at every frequency, acquiring noise power that indicates a magnitude of noise in the sound represented by the audio signal received by the sound reception unit, at every frequency, dividing the corrected input power by the acquired noise power to compute a signal-to-noise per frequency ratio, for acquiring a signal-to-noise ratio that is a representative value of all the values of the computed signal-to-noise per frequency ratio, and if the acquired signal-to-noise ratio is greater than a predetermined threshold, determining that the sound represented by the received audio signal is speech sound.

Either of the speech sound detection method and the speech sound detection program configured as in the above has functions similar to those of the speech sound detection apparatus, and therefore, they can attain the aforementioned object of the present invention.

Although the present invention has been described in the context of the exemplary embodiments, the present invention should not be intended to be limited to the precise forms of the aforementioned exemplary embodiments. A variety of modification as contemplated by any person skilled in the art can be made to arrangements and details of the present invention without departing of the true scope of the present invention.

For instance, in one modified version of the exemplary embodiment, the correction function estimation unit 14 may be adapted to take, as the reference power $y_i$ average time-averaged power resulting from averaging all the values of the time-averaged power $x_i$ computed for every one of the plurality of the microphones MC1 to MCL by the time-averaged power computation unit 13.

In this way, even if excessively great noise is developed in the vicinity of a certain microphone, adverse effects of such noise on the reference power $y_i$ can be alleviated.

In another modified version of the exemplary embodiment, the correction function estimation unit 14 may be adapted to take a value stored in a memory device in advance as the reference power $y_i$.

Although in the aforementioned exemplary embodiment, the correction function estimation unit 14 is adapted to estimate the correction function only when the sound represented by the received sound signal is white noise, the correction function may alternatively be estimated when the sound represented by the received audio signal is any of predetermined types of sound other than white noise.

In a further modified version of the exemplary embodiment, any combination of the aforementioned embodiments and their respective modified versions may be employed.

Although, in each of the exemplary embodiments, the program is stored in the memory device, it may be stored in a computer-readable data storage medium. The data storage medium includes, for example, flexible disks, optical disks, magneto-optical disks, semiconductor memories, and any other portable media.

INDUSTRIAL APPLICABILITY

The present invention is applicable to speech sound detection systems having more than one microphones for determining whether or not the sound input through the microphones is speech sound.

DESCRIPTION OF REFERENCE SYMBOLS

1 Speech Sound Detection Apparatus
11 Input Power Computation Unit
12 Input Power Correcting unit
13 Time-averaged Power Computation Unit
14 Correction Function Estimation Unit
15 Correction Function Storage Unit
16 Speech Sound Detection Unit
16*a* Noise Power Acquisition unit
16*b* Signal-to-Noise Ratio Acquisition unit
18 Sound Reception Unit
MC1 to MCL Microphones

The invention claimed is:

1. A speech sound detection apparatus comprising:

a sound reception unit for receiving an input audio signal, an input power computation unit performing an input power computation operation for computing at every frequency input power that indicates a magnitude of sound represented by an audio signal, based upon the audio signal received by the sound reception unit, a correction function estimation unit performing a correction function estimation operation for estimating a correction function that is a continuous function defining a relation between a certain frequency and a correction coefficient used to approximate the computed input power at that frequency to the reference power predetermined for that frequency, an input power correcting unit performing input power correction operation of multiplying the computed input power by the correction coefficient obtained in accordance with the relation defined by the estimated correction function, for correcting the input power at every frequency, and a speech sound detection unit performing a speech sound detection operation for determining whether or not the sound represented by the received audio signal is speech sound, based upon the corrected input power, wherein the correction function estimation unit is adapted to estimate the correction function according to which the sum of all the values resulting from squaring the difference between the corrected input power and the reference power over a predetermined frequency range is minimal.

2. The speech sound detection apparatus according to claim 1, wherein the correction function is a polynomial function with regard to a variable of the frequency.

3. The speech sound detection apparatus according to claim 1, wherein the speech sound detection unit includes:

a noise power acquisition unit for acquiring, at every frequency, noise power that indicates a magnitude of noise in the sound represented by the audio signal received by the sound reception unit; and a signal-to-noise ratio acquisition unit computing a signal-to-noise per frequency ratio by dividing the corrected input power by the acquired noise power and acquiring at every frequency a signal-to-noise ratio that is a representative value of all the values of the computed signal-to-noise per frequency ratio, the speech sound detection unit being adapted to determine that the sound represented by the received audio signal is speech sound if the acquired signal-to-noise ratio is greater than a predetermined threshold.

4. The speech sound detection apparatus according to claim 3, wherein the signal-to-noise ratio acquisition unit is adapted to acquire as the signal-to-noise ratio, the sum of all the values of the computed signal-to-noise per frequency ratio over a predetermined frequency range.

5. The speech sound detection apparatus according to claim 3, wherein the signal-to-noise ratio acquisition unit is adapted to acquire as the signal-to-noise ratio, the maximum of all the values of the computed signal-to-noise per frequency ratio.

6. The speech sound detection apparatus according to claim 3, comprising a plurality of the sound reception units, wherein the input power computation unit is adapted to perform the input power computation operation for each of the plurality of the sound reception units;

the correction function estimation unit is adapted to perform a correction function estimation operation for each of the plurality of the sound reception units;

the input power correcting unit is adapted to perform the input power correction operation for each of the plurality of the sound reception units; and the speech sound detection unit is adapted to perform the speech sound detection operation for each of the sound reception units and to take at every frequency the minimum of all the values of the input power corrected for each of the plurality of the sound reception units by the input power correcting unit, as the noise power for the sound reception unit which has received the audio signal being the basis to calculate the maximum of all the values of the input power corrected for each of the plurality of the sound reception units by the input power correcting unit.

7. The speech sound detection apparatus according to claim 6, wherein the speech sound detection unit is adapted to take at every frequency, as the noise power for the sound reception unit, the input power corrected for the sound reception unit by the input power correcting unit, the sound reception unit being other than the sound reception unit which has received the audio signal being the basis to calculate the maximum of all the values of the input power corrected for each of the plurality of the sound reception units by the input power correcting unit.

8. The speech sound detection apparatus according to claim 6, wherein the correction function estimation unit is adapted to take as the reference power the input power computed for a certain one of the plurality of the sound reception units by the input power computation unit.

9. The speech sound detection apparatus according to claim 8, wherein the input power computation unit is adapted to divide the audio signal received by the sound reception unit for every predetermined frame interval and compute the input power for each of the divided portions at every frequency;

the speech sound detection apparatus comprising a time-averaged power computation unit that performs a time-averaged power computation operation for each of the plurality of the sound reception units for computing time-averaged power that is an average of all the values of the input power computed for each of the portions of the audio signal by the input power computation unit; and the correction function estimation unit being adapted to perform a correction function estimation operation for each of the plurality of the sound reception units for estimating a correction function defining a relation between a certain frequency and a correction coefficient used to approximate the time-averaged power computed at that frequency to the time-averaged power computed on a certain one of the plurality of the sound reception units by the time-averaged power computation unit and especially computed at that frequency.

10. The speech sound detection apparatus according to claim 6, wherein the correction function estimation unit is adapted to take, as the reference power, average power that is an average of all the values of the input power computed for each of the plurality of the sound reception units by the input power computation unit.

11. The speech sound detection apparatus according to claim 10, wherein the input power computation unit is adapted to divide the audio signal received by the sound reception units for every predetermined frame interval and compute the input power for each of the divided portions at every frequency;

the speech sound detection apparatus comprising a time-averaged power computation unit that performs a time-averaged power computation operation, for each of the plurality of the sound reception units, for computing time-averaged power which is an average of all the values of the input power computed for each of the portions of the audio signal by the input power computation unit; and the correction function estimation unit being adapted to perform a correction function estimation operation for each of the plurality of the sound reception units for estimating a correction function defining a relation between a certain frequency and a correction coefficient used to approximate the time-averaged power computed at that frequency to the average time-averaged power that is an average of all the values of the time-averaged power computed by the time-averaged power computation unit for each of the plurality of the sound reception units and especially computed at that frequency.

12. The speech sound detection apparatus according to claim 1, wherein the correction function estimation unit takes a value stored in advance as the reference power.

13. The speech sound detection apparatus according to claim 1, wherein the correction function estimation unit is adapted to estimate the correction function when the sound represented by the audio signal received by the sound reception unit is white noise.

14. A speech sound detection method comprising:

based upon an audio signal received by a sound reception unit for receiving an input audio signal, computing input power that indicates a magnitude of sound represented by the audio signal, at every frequency, estimating a correction function that is a continuous function defining a relation between a certain frequency and a correction coefficient used to approximate the computed input power at that frequency to the reference power predetermined for that frequency, multiplying the computed input power by the correction coefficient obtained in accordance with the relation defined by the estimated correction function, for correcting the input power at every frequency, and determining whether or not the sound represented by the received audio signal is speech sound, based upon the corrected input power, wherein estimating a correction function is estimating a correction function according to which the sum of all the values resulting from squaring the difference between the corrected input power and the reference power over a predetermined frequency range is minimal.

15. The speech sound detection method according to claim 14, wherein the correction function is a polynomial function with regard to a variable of the frequency.

16. The speech sound detection method according to claim 14, further comprising at every frequency, acquiring noise power that indicates a magnitude of noise in the sound represented by the audio signal received by the sound reception unit, at every frequency, dividing the corrected input power by the acquired noise power to compute a signal-to-noise per frequency ratio, for acquiring a signal-to-noise ratio that is a representative value of all the values of the computed signal-to-noise per frequency ratio, and if the acquired signal-to-noise ratio is greater than a predetermined threshold, determining that the sound represented by the received audio signal is speech sound.

17. A non-transitory computer-readable medium storing a speech sound detection program comprising instructions for causing an information processing device to realize:

an input power computation unit performing an input power computation operation for computing at every frequency input power that indicates a magnitude of sound represented by an audio signal received by a sound reception unit for receiving an input audio signal, based upon the audio signal received by the sound reception unit, a correction function estimation unit performing a correction function estimation operation for estimating a correction function that is a continuous function defining a relation between a certain frequency and a correction coefficient used to approximate the computed input power at that frequency to the reference power predetermined for that frequency, an input power correcting unit performing input power correction operation of multiplying the computed input power by the correction coefficient obtained in accordance with the relation defined by the estimated correction function, for correcting the input power at every frequency, and a speech sound detection unit performing a speech sound detection operation for determining whether or not the sound represented by the received audio signal is speech sound, based upon the corrected input power, wherein the correction function estimation unit is adapted to estimate the correction function according to which the sum of all the values resulting from squaring the difference between the corrected input power and the reference power over a predetermined frequency range is minimal.

18. The non-transitory computer-readable medium according to claim 17, wherein the correction function is a polynomial function with regard to a variable of the frequency.

19. The non-transitory computer-readable medium according to claim 17, wherein the speech sound detection unit includes:

a noise power acquisition unit for acquiring, at every frequency, noise power that indicates a magnitude of noise in the sound represented by the audio signal received by the sound reception unit, and a signal-to-noise ratio acquisition unit computing a signal-to-noise per frequency ratio by dividing the corrected input power by the acquired noise power and acquiring at every frequency a signal-to-noise ratio that is a representative value of all the values of the computed signal-to-noise per frequency ratio, the speech sound detection unit being adapted to determine that the sound represented by the received audio signal is speech sound if the acquired signal-to-noise ratio is greater than a predetermined threshold.

20. A speech sound detection apparatus comprising:

a sound reception means for receiving an input audio signal, an input power computation means performing an input power computation operation for computing at every frequency input power that indicates a magnitude of sound represented by an audio signal, based upon the audio signal received by the sound reception means, a correction function estimation means performing a correction function estimation operation for estimating a correction function that is a continuous function defining a relation between a certain frequency and a correction coefficient used to approximate the computed input power at that frequency to the reference power predetermined for that frequency, an input power correcting means performing input power correction operation of multiplying the computed input power by the correction coefficient obtained in accordance with the relation defined by the estimated correction function, for correcting the input power at every frequency, and a speech sound detection means performing a speech sound detection operation for determining whether or not the sound represented by the received audio signal is speech sound, based upon the corrected input power, wherein the correction function estimation means is adapted to estimate the correction function according to which the sum of all the values resulting from squaring the difference between the corrected input power and the reference power over a predetermined frequency range is minimal.

* * * * *